US006782595B1

(12) United States Patent
Van Der Beek et al.

(10) Patent No.: US 6,782,595 B1
(45) Date of Patent: Aug. 31, 2004

(54) METHOD FOR BRIQUETTING METAL CHIPS AND BRIQUETTING PRESS

(75) Inventors: August Van Der Beek, Grevenbroich (DE); Michael Schaaf, Solingen (DE); Walter Fischer, Neuss (DE); Harald Pechtel, Neuss (DE)

(73) Assignee: Metso Lindemann GmbH, Dusseldorf (DE)

( * ) Notice: Subject to any disclaimer, the term of this patent is extended or adjusted under 35 U.S.C. 154(b) by 0 days.

(21) Appl. No.: 09/959,240

(22) PCT Filed: Apr. 12, 2000

(86) PCT No.: PCT/DE00/01115

§ 371 (c)(1), (2), (4) Date: Feb. 20, 2002

(87) PCT Pub. No.: WO00/63005

PCT Pub. Date: Oct. 26, 2000

(30) Foreign Application Priority Data

Apr. 19, 1999 (DE) ........................................ 199 17 421

(51) Int. Cl.[7] ................................................ B23Q 17/00

(52) U.S. Cl. ..................... 29/407.05; 29/238; 29/403.2; 29/407.1; 100/45; 100/48; 100/50; 100/52

(58) Field of Search ......................... 29/407.05, 407.09, 29/407.1, 705, 720, 403.1, 403.2, 238; 264/40.1, 40.4, 40.5; 100/45, 48, 50, 52, 217, 218, 249, 256, 229 R, 906; 425/135, 140, 141, 145, 149, 150

(56) References Cited

U.S. PATENT DOCUMENTS

| | | | | | |
|---|---|---|---|---|---|
| 737,425 | A | * | 8/1903 | Laernoes et al. | 100/218 |
| 737,427 | A | * | 8/1903 | Lemberg | 100/208 |
| 752,565 | A | * | 2/1904 | Koneman | 425/107 |
| 843,565 | A | * | 2/1907 | Misner | 425/205 |
| 896,427 | A | * | 8/1908 | Abbott | 425/382 R |
| 952,960 | A | * | 3/1910 | Fernholtz | 425/376.1 |
| 1,054,464 | A | * | 2/1913 | Soucek | 425/378.1 |
| 1,057,029 | A | * | 3/1913 | Bartlett | 425/422 |
| 1,183,760 | A | * | 5/1916 | Parker | 264/603 |
| 1,463,094 | A | * | 7/1923 | Rigby | 425/376.1 |
| 1,473,389 | A | * | 11/1923 | Smith et al. | 100/215 |
| 1,819,740 | A | * | 8/1931 | Davis | 425/449 |
| 1,860,075 | A | * | 5/1932 | Byerlein et al. | 100/193 |
| 2,110,972 | A | * | 3/1938 | Dinzl | 425/78 |
| 2,128,241 | A | * | 8/1938 | Goss | 425/345 |
| 2,206,000 | A | * | 6/1940 | Byerlein | 100/353 |
| 2,311,940 | A | * | 2/1943 | Grob | 100/353 |
| 2,332,170 | A | * | 10/1943 | Sapp | 425/311 |
| 2,359,674 | A | * | 10/1944 | Pollock | 425/420 |
| 2,360,487 | A | * | 10/1944 | Fullerton | 100/143 |
| 2,384,163 | A | * | 9/1945 | Flowers | 425/149 |
| 2,507,491 | A | * | 5/1950 | Crea | 425/182 |
| 2,537,920 | A | * | 1/1951 | Smith | 425/556 |
| 2,780,987 | A | * | 2/1957 | Wall | 100/35 |
| 2,817,891 | A | * | 12/1957 | Zweigle | 425/204 |
| 2,966,842 | A | * | 1/1961 | Roche | 100/209 |
| 2,984,172 | A | * | 5/1961 | Roberts et al. | 100/90 |
| 3,141,401 | A | * | 7/1964 | Lindemann et al. | 100/98 R |
| 3,386,374 | A | * | 6/1968 | Tezuka | 100/215 |
| 3,450,529 | A | * | 6/1969 | MacDonald | 419/23 |
| 3,564,993 | A | * | 2/1971 | Tezuka et al. | 100/215 |
| 3,626,577 | A | * | 12/1971 | Trible | 29/403.2 |
| 3,744,118 | A | * | 7/1973 | Whalen et al. | 29/403.2 |

(List continued on next page.)

*Primary Examiner*—Gregory Vidovich
*Assistant Examiner*—Essama Omgba
(74) *Attorney, Agent, or Firm*—Norris McLaughlin & Marcus, P.A.

(57) ABSTRACT

A method and a briquetting press for briquetting metal chips wherein stable briquettes/pressed components are produced. The actual length ($L_{act}$) of the pressed component is obtained by applying pressure ($P_{max}/P_{req}$) using at least one pressing ram (1,2) and measuring the length with a measuring device (5, 6). The measured value is compared to a desired nominal value ($L_{nom}$) and a difference value ($\Delta$) is subsequently determined.

9 Claims, 2 Drawing Sheets

U.S. PATENT DOCUMENTS

| | | | | | |
|---|---|---|---|---|---|
| 3,774,289 | A | * | 11/1973 | Cacace et al. | 29/403.2 |
| 3,783,494 | A | * | 1/1974 | Whalen et al. | 29/403.2 |
| 3,810,421 | A | * | 5/1974 | Mosley | 100/95 |
| 3,824,054 | A | * | 7/1974 | Harris | 425/149 |
| 3,838,634 | A | * | 10/1974 | Alexandrov et al. | 100/50 |
| 3,901,635 | A | * | 8/1975 | Greenberger | 425/145 |
| 3,980,014 | A | * | 9/1976 | McEwen et al. | 100/127 |
| 4,123,209 | A | * | 10/1978 | Moore | 425/74 |
| 4,272,877 | A | * | 6/1981 | Takeuchi et al. | 29/403.2 |
| 4,275,650 | A | * | 6/1981 | Telling | 100/45 |
| 4,333,394 | A | * | 6/1982 | Brown | 100/42 |
| 4,483,246 | A | * | 11/1984 | Sullivan et al. | 100/35 |
| 4,559,004 | A | * | 12/1985 | Augier | 425/261 |
| 4,601,238 | A | * | 7/1986 | Davis et al. | 100/45 |
| 4,669,375 | A | * | 6/1987 | Newsom et al. | 100/45 |
| 4,700,622 | A | * | 10/1987 | Satake | 100/45 |
| 4,750,417 | A | * | 6/1988 | Newsom et al. | 100/35 |
| 4,787,308 | A | * | 11/1988 | Newsom et al. | 100/50 |
| 5,059,372 | A | * | 10/1991 | Klais | 264/120 |
| 5,083,509 | A | * | 1/1992 | Hansen et al. | 100/73 |
| 5,088,399 | A | * | 2/1992 | Cacace et al. | 100/218 |
| 5,145,692 | A | * | 9/1992 | Hereford | 425/139 |
| 5,318,426 | A | * | 6/1994 | Hanson et al. | 425/64 |
| 5,326,511 | A | * | 7/1994 | Cooper et al. | 264/40.1 |
| 5,494,626 | A | * | 2/1996 | Middleton | 264/115 |
| 5,503,788 | A | * | 4/1996 | Lazareck et al. | 264/115 |
| 5,507,988 | A | * | 4/1996 | Eagan et al. | 264/122 |
| 5,542,348 | A | * | 8/1996 | Bendzick | 100/37 |
| 5,582,846 | A | * | 12/1996 | Cooper et al. | 425/140 |
| 5,629,033 | A | * | 5/1997 | Lienau | 425/353 |
| 5,664,492 | A | * | 9/1997 | Bendzick | 100/45 |
| 6,272,981 | B1 | * | 8/2001 | Murata et al. | 100/50 |
| 6,349,638 | B1 | * | 2/2002 | Thompson | 100/218 |
| 6,357,099 | B1 | * | 3/2002 | Takano et al. | 29/403.2 |
| 6,497,023 | B2 | * | 12/2002 | Takano et al. | 29/238 |
| 6,546,855 | B1 | * | 4/2003 | Van Der Beek et al. | 100/39 |

* cited by examiner

METHOD FOR BRIQUETTING METAL CHIPS AND BRIQUETTING PRESS

BACKGROUND OF THE INVENTION

1. Field of the Invention

The invention relates to a method for briquetting metal chips and a briquetting press for carrying out the method.

2. Description of the Invention

DEA-40 39 788 discloses briquetting presses that have at least one pressing ram disposed in a pressing sleeve to press metal chips in the form of briquettes. A stamper is used to feed the metal chips to a metering device disposed radially in relation to the pressing sleeve. The process flow is as follows:

- advancing the stamper, filling and closing the pressing sleeve,
- advancing the pressing ram and feeding the metal chips into the pressing section of the pressing sleeve,
- applying pressure to the metal chips with at least one pressing ram until a final pressure $P_{max}$ or a required pressure $P_{req}$ is attained,
- optionally, retracting a second pressing ram and expelling the completed pressed article as a briquette using the first pressing ram, and
- retracting the first pressing ram and, optionally, advancing the second pressing ram into the initial position.

The aforedescribed, optionally double-acting, briquetting presses, unlike conventional briquetting presses, produce a pressed article with a particularly high densification approximating the intrinsic density of the metal, and also have a high throughput, thereby optimally achieving both a high density and a high efficiency. In contrast to single-sided presses, significantly longer briquettes can be produced, because the stroke lengths, in order to be manageable, have to stay within practical limits, as determined by the machine tool and the manufacturing environment.

EP-A-0 367 859 also describes a method and a briquetting press for making briquettes having dimensional stability from pressed material in the form of chips, fiber, dust, and lamellar material. The material to be pressed is hereby fed to a precompacting plunger and precompacted in a receiving chamber and thereafter further compacted in a forming box by a press plunger which moves perpendicular to the precompacting plunger. According to this invention, by exactly determining the end position of the press plunger and the precompacting plunger, respectively, variations in the material to be pressed can be almost entirely eliminated, so that the intended power of the press can be utilized with a high efficiency.

However, the results from these technical teachings can not be applied to axially-aligned, double-acting briquetting presses.

U.S. Pat. No. 5,326,511 also teaches a solution similar to that of the previous reference. However, even when taking into account all the features of this type of presses which operate with a precompacting plunger and a press plunger in mutually perpendicularly disposition, the prior art presses do not suggest an obvious solution that can be adapted to pressing rams operating in opposing directions in a pressing sleeve, since this arrangement represents a completely different type of press with an entirely different operating characteristic.

Indeed, a double-acting briquetting press with pressing rams operating in a pressing sleeve cannot easily produce pressed articles in the form of briquettes with a workable and acceptable length and also a small manufacturing tolerance. Disadvantageously, the maximum possible fill volume in the pressing sleeve over the length of the briquette can hence not be fully utilized even if maximum pressing power is applied.

BRIEF SUMMARY OF THE INVENTION

It is an object of the invention to provide a method that provides a greater mass throughput of metal chips to be pressed by utilizing the maximum usable nominal length of the briquette, while maintaining the aforedescribed, generally advantageous functional process flow. This is achieved with an improved metering process of the metal chips which results in a maximum fill volume in the pressing sleeve. It is also an object to provide a briquetting press with suitable technical means for carrying out the method so as to improve metering of the metal chips.

The invention as a whole is intended to produce dimensionally stable briquettes.

The invention is limited to a type of press with only a single pressing sleeve with an opening for the radially disposed metering device with a stamper, which simultaneously functions as a closing member for the opening in the pressing sleeve, as well as two pressing rams with piston rods guided in this pressing sleeve and a stand, frame or housing adapted to receive these components and associated pressure generators.

According to the invention, a method for briquetting of metal chips in a briquetting press is described. The briquetting is done by applying pressure to an article with two pressing rams, which operate in opposite directions. The rams are disposed in a pressing sleeve into which the metal chips are supplied via a metering device by a stamper, which is arranged in radial disposition on the pressing sleeve. Once the stamper fills the pressing sleeve with metered metal chips, the pressing sleeve is closed. Both pressing rams are advanced and feed the metal chips into the pressing section of the pressing sleeve. Pressure is then applied to the metal chips with both pressing ram until a final pressure $P_{max}$ or a required pressure $P_{req}$ is attained. The pressing rams are then retracted, and the completed pressed article is expelled as a briquette. The rams are returned to their initial position. When the pressure $P_{max}/P_{req}$ is applied by the rams, the attained length ($L_{act}$) of the pressed article is measured with a measurement device, and this value is compared with a nominal value ($L_{nom}$). A difference in the two values is determined (Δ). Further, the quantity/mass of a metal chips to be fed from the metering device is determined from this difference value (Δ) according to the nominal length ($L_{nom}$) of the pressed article and, subsequently, the fill quantity is adjusted in the metering device and the corresponding quantity/mass is supplied by the stamper. The process steps of the process flow loop may be repeated again, and pressure may be applied to the metal chips collectively with the pressing rams until the final pressure $P_{max}$ and/or the required pressure $P_{req}$ is attained so as to thereby obtain the nominal value ($L_{nom}$) of the length of the briquettes.

It is also contemplated to use an integrated measurement device for determining and/or adjusting the lengths of the briquettes ($L_{act}$ and $L_{nom}$, respectively). The measurement device may be integrated on a piston rod of the pressing ram. An electronic logic module is used for determining the length of the briquettes from the relative position of the pressing ram (1, 2) with the integrated measurement device (5, 6) according to the relationship ($L_{nom/act}=S_1-S_2$). The use of an electronic logic module activates in the metering device a command to increase the metered amount, if it is determined that the actual length $L_{act}$ of the briquettes is smaller than the nominal value $L_{nom}$. It is also possible to activate a command to decrease the metered amount, if it is determined that the actual length $L_{act}$ of the briquettes is greater than the nominal value $L_{nom}$. Further, it is contemplated that the electronic control circuit includes actuators for setting the process data required by the present process, such as the metered quantity, density of the pressed article, length of the pressed article and pressing power. Accordingly, a briquetting press for carrying out the method includes components that carry out the functional operations of the machine, such as a pressing sleeve with an opening for the radially disposed metering device with a stamper which operates also as a closing member for the opening in the pressing sleeve, two pressing rams with piston rods guided in the pressing sleeve, and a stand, frame or housing receiving these components as well as associated pressure generators. Each of the piston rods of the pressing rams is provided with a measurement device. A control circuit for affecting metering of the metal chips as a function of the briquette lengths ($L_{nom}/L_{act}$), as determined by the measurement device, is provided between the measurement device and the metering device, and the control circuit includes actuators and a logic module for controlling the process flow according to the relationship between the briquette length and the metered quantity/mass.

BRIEF DESCRIPTION OF THE DRAWINGS

The drawings show in

DETAILED DESCRIPTION OF THE INVENTION

Figure 1:
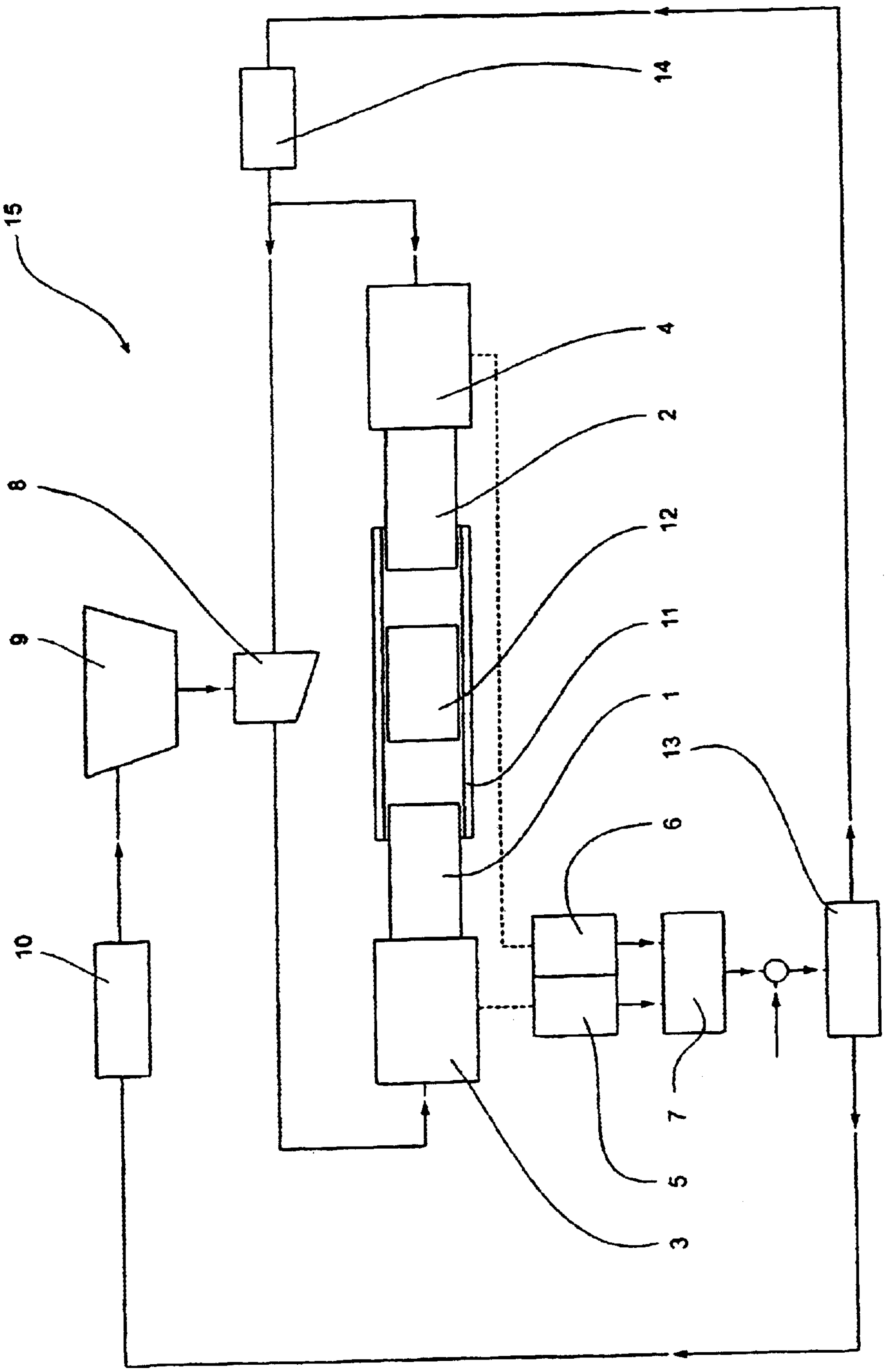
FIG. 1 the principle of the invention, depicted in a schematic diagram of a double-acting briquetting press with control circuit, and FIG. 2 a schematic diagram of the control circuit of FIG. 1.

FIG. 1 shows schematically an embodiment of a double-acting briquetting press with two pressing rams 1, 2, piston rods 3, 4, and measurement devices 5, 6. However, the invention can also be applied to single-acting briquetting presses with a single pressing ram, a single piston rod and a single measurement device. Arranged before the briquetting press is a metering device 9 with a stamper 8 which supplies the metal chips to a pressing sleeve 11 in which the pressed article is formed as a briquette through cooperation of the pressing rams 1, 2.

Figure 2:
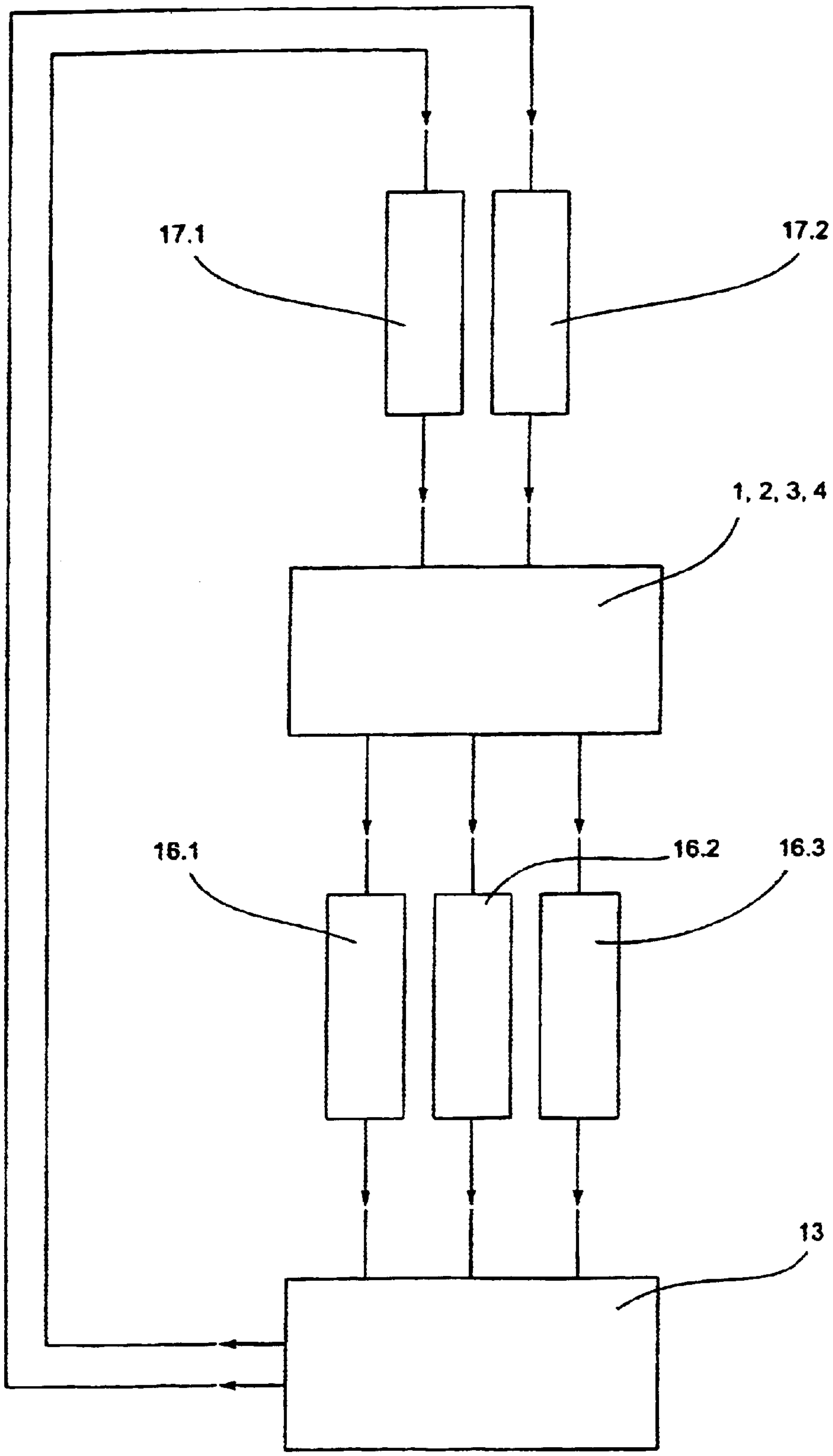

A control circuit 15 associated with the briquetting press includes the measurement devices 5, 6, a logic module 7, a controller 13 and actuators 10, 17 (FIG. 2).

According to FIG. 2, the following schematically depicted functions are controlled: density of the pressed article 16.1, length of the pressed article 16.2, pressing power 16.3 and feed amount 17.1 as well as pressing power 17.2.

The pressed article 12 is produced by applying pressure in the pressing sleeve 11 with the pressing rams 1, 2 according to the following process flow:

(a) advancing stamper 8, filling the pressing sleeve 11 with metal chips via a radial disposed metering device 9, and closing the pressing sleeve 11, (b) advancing the pressing rams 1, 2, and feeding the metal chips into the pressing section of the pressing sleeve, (c) applying pressure to the metal chips with the combination of pressing rams 1, 2 until an end pressure $P_{max}$ and/or a required pressure $P_{req}$ is reached (d) retracting the pressing rams 1, 2 and expelling the finished pressed article.

According to the invention, during the application of pressure $P_{max}/P_{req}$ with the pressing rams 1, 2, the actually attained length of the pressed article $L_{act}$ is measured with the measurement devices 5, 6, this measured value is compared with a nominal value $L_{nom}$, whereafter a difference value $\Delta$ is determined. The quantity and/or mass of the metal chips that the metering device 9 has to supply is determined by the desired nominal length $L_{nom}$ of the pressed article 12. Thereafter, the filling amount is adjusted in the metering device 9 and the corresponding amount and/or mass is supplied by the stamper 8. This process flow can be repeated until the final pressure $P_{max}$ and/or the required pressure $P_{req}$ is achieved and the briquette and/or the pressed article 12 has attained its nominal length $L_{nom}$.

An electronic logic module 7 is used to determine with the integrated measurement device 5, 6 the length of the briquette from the relative position of the pressing rams 1, 2. The logic module 7 activates, according to the relationship $L_{nom}=S_1-S_2$, a) a command to increase the metered quantity, if it is determined that the actual length $L_{act}$ is below the nominal value $L_{nom}$, or b) a command to decrease the metered quantity, if it is determined that the actual length $L_{act}$ is greater than the nominal value $L_{nom}$.

What is claimed is:

1. A method for preparing briquettes from metal chips by applying pressure to the metal chips with two pressing rams to form a pressed article, the pressing rams operating in opposite directions and disposed in a pressing sleeve, the metal chips being supplied to the pressing sleeve via a metering device by a stamper, which is arranged in radially on the pressing sleeve, comprising the steps:

(a) advancing the stamper for filling the pressing sleeve with metal chips and closing the pressing sleeve;

(b) advancing the pressing rams towards the metal chips in the pressing sleeve;

(c) applying pressure to the metal chips with both pressing rams until a pressure $P_{max}$ or a required pressure $P_{req}$ is attained and a pressed article is formed, measuring the actual length ($L_{act}$) of the pressed article and comparing the actual measured length to a nominal length value ($L_{nom}$) to determine the difference ($\Delta$) between the actual and the nominal lengths;

(d) determining from the difference ($\Delta$) in length a corrected amount of metal chips to be fed from the metering device into the sleeve, and adjusting the amount of metal chips to be supplied to the metering device by supplying the corresponding amount to the stamper.

2. The method according to claim 1, further comprising a step of (e) repeating steps (c) and (d) until the actual length ($L_{act}$) is equal to the nominal value ($L_{nom}$).

3. The method according to claim 1, wherein an integrated measurement device is utilized for determining the lengths of the pressed metal chips.

4. The method according to claim 3, wherein the length is determined with a measurement device associated with the piston rod of the pressing ram.

5. The method according to claim 3, wherein the length is determined with an electronic logic module from relative positions of the pressing rams ($S_1$, $S_2$) according to the relationship ($L_{nom/act}=S_1-S_2$).

6. The method according to claim 5, wherein the electronic logic module activates a command for increasing the metered amount in the metering device, upon determining that the actual length $L_{act}$ of the briquettes is smaller than the nominal value $L_{nom}$.

7. The method according to claim 5, wherein the electronic logic module activates a command for decreasing the metered amount in the metering device, upon determining that the actual length $L_{act}$ of the briquettes is greater than the nominal value $L_{nom}$.

8. The method according to claim 1, wherein the process steps (a)–(d) are controlled with an electronic control circuit with an actuator by setting at least one of feed amount of metal ships, density of the pressed metal chips, length of the pressed metal chips and pressing powers.

9. A briquetting press for preparing briquettes from metal chips, comprising (a) a housing;

(b) a pressing sleeve including an opening for a radially disposed metering device with stamper, the stamper being designed to close off the pressing sleeve, the pressing sleeve disposed in the housing;

(c) two pressing rams having each a piston rod disposed in the pressing sleeve; and (d) a pressure generator associated with each piston rod, wherein each piston rod is associated with a measurement device;

(e) a control circuit for affecting metering of the metal chips as a function of the briquette lengths ($L_{nom}/L_{act}$), as determined by the measurement device, is provided between the measurement device and the metering device, and (c) the control circuit includes actuators and a logic module for controlling the process flow according to the relationship between the pressed metal chip length and the metered amount.

* * * * *